US005708699A

United States Patent [19]
Concepcion et al.

[11] Patent Number: 5,708,699
[45] Date of Patent: Jan. 13, 1998

[54] HYBRID ACCESS ARCHITECTURE FOR VOICE MESSAGING SYSTEMS

[75] Inventors: Cronder Concepcion, New York, N.Y.; Silvio Maximo Susskind, Westfield, N.J.

[73] Assignee: AT&T, Middletown, N.J.

[21] Appl. No.: 657,696

[22] Filed: May 29, 1996

[51] Int. Cl.⁶ .............................. H04M 1/65; H04M 3/50
[52] U.S. Cl. .............................. 379/89; 379/207; 379/211
[58] Field of Search .............................. 379/89, 67, 207, 379/201, 211, 220, 219

[56] References Cited

U.S. PATENT DOCUMENTS 5,199,062  3/1993  Von Meister et al. .............. 379/67
5,450,488  9/1995  Pugaczewski et al. .............. 379/67

*Primary Examiner*—Thomas W. Brown
*Attorney, Agent, or Firm*—Thomas Restaino

[57] ABSTRACT

An architecturally and cost efficient method and system are disclosed for accessing a voice messaging platform. An exemplary method for accessing the platform includes: (1) forwarding a telephone call to the platform over foreign exchange lines when the telephone call involves a caller who, upon call initiation to a called party subscriber, encountered a busy or ring-no-answer condition, so that the caller may leave a message for the called party in the called party's mailbox; and (2) routing a telephone call to the platform over a trunk group local to the platform when the telephone call involves a caller-subscriber initiating a telephone call directly to the platform to access his/her mailbox to retrieve messages, administer greetings, and/or send voice messages to other subscribers. For calls forwarded over foreign exchange lines, the platform is provided with a wide variety of call information transmitted via an SMDI link. For direct calls, calls are routed to the trunk group via an LEC network capable of transmitting a calling party number associated with each call and thus, the platform is provided with the only call information necessary to service such calls—namely, a calling party number. As such, direct traffic to the platform is aggregated through the end office local to the platform and economies of scale are achieved. Moreover, all subscribers to the voice messaging service, regardless of their geographic location, can dial the same number to access the voice messaging platform.

20 Claims, 2 Drawing Sheets

HYBRID ACCESS ARCHITECTURE FOR VOICE MESSAGING SYSTEMS

TECHNICAL FIELD

This invention relates generally to a system and method for routing telephone calls to a voice messaging platform.

BACKGROUND

It is known in the art of telecommunications to provide "automatic voice messaging" where, upon the occurrence of a busy or ring-no-answer condition, the caller can be connected to a Voice Messaging Platform (VMP) for purposes of recording a voice message for the called party ("the subscriber"). The subscriber is provided with a Message Waiting Indicator (MWI) in the form of a stutter dial tone or a flashing light on the subscriber's telephone and, the subscriber, upon detection of the MWI, can dial into the VMP to retrieve the recorded message from his/her mailbox.

However, subscription rates to these voice messaging services are such that placing a single VMP at each end office (EO) is impractical. Therefore, economies of scale dictate that a VMP serve a plurality of EOs. One way to extend a VMP beyond its local EO is through the use of Foreign Exchange (FX) lines. See FIG. 1. In general, an FX line installed at a customer's request ("Customer A") enables that customer to have a "presence" (i.e. a number) in a distant or "foreign" EO. As such, Customer A will be served by the foreign EO rather than by his/her local EO on all calls to or from other customers. In particular, calls to Customer A from customers in the Local Calling Area of the foreign EO are treated as local calls for toll purposes.

In the context of a VMP (in effect, "Customer A") serving a plurality of EOs, a group of FX lines is typically established between the VMP and each of the remote EOs. The FX lines constitute a Multi-line Hunt Group (MLHG); that is to say, a group of lines addressed by the same telephone number. For voice messaging systems, signaling for each FX line is provided out-of-band by Simplified Message Desk Interface (SMDI) links. SMDI links are used to transmit information such as the calling party number, called party number, MLHG number, MLHG member number, forwarding party number, and the reason why the call is being forwarded from the remote EO to the VMP. The SMDI links are also used to transmit the Message Waiting Indicator (MWI) from the VMP to the remote EO for delivery to the subscriber.

The foregoing architecture is currently used for: (1) calls forwarded to the VMP from a subscriber line, when a caller encounters a busy or ring-no-answer condition and (2) direct calls to the VMP from the subscriber line, such as when a subscriber calls the platform to retrieve messages from his/her mailbox, administer greetings, or send voice messages to other subscribers. The foregoing architecture nevertheless suffers from some serious deficiencies from the standpoint of the VMP service provider.

As shown in FIG. 1, a group of FX lines connects each of the remote EOs to the VMP. Recall that the FX lines permit the VMP to have a "presence" in each subscriber's EO and that a call to the VMP appears to the subscriber as a local call. Although a call to the VMP passes through the special service circuits of the EO local to the VMP, the call does not pass through that EO's switching network; rather, all switching is performed by the remote EO. Thus, the overall traffic to the VMP is divided by the number of remote EOs. Basic traffic engineering theory and practice indicates that such disaggregation of traffic requires more lines than if the traffic were aggregated. Consider, by analogy, checkout counters in a supermarket. Fewer cashiers would be required to handle the same number of customers in the same period of time if, rather than forming a line for each cashier (assuming no jockeying between lines is permitted), the customers were aggregated in a single line, with the first customer in line being served by the next available cashier. This increase in efficiency results from not having an idle cashier while other cashiers have customers waiting. In our analogy, the lines of customers and the cashiers would correspond in FIG. 1 to calls by the remote EOs' subscribers and the FX lines, respectively.

Moreover, FX lines are expensive. In addition to the usual local channel charges for the local loop between the VMP and the EO local to the VMP (although not shown in FIG. 1, it is understood by those of ordinary skill in the art that traffic to the VMP passes through special service circuits in the EO local to the VMP, although all switching of the traffic is performed by the remote EO), the VMP provider incurs inter-office channel charges (for the FX line between the EO local to the VMP and the remote EO) and mileage charges. Both local and interoffice charges are incurred as a flat fee upon installation and thereafter on a recurring (e.g. monthly) basis. Mileage charges are incurred as a flat fee on a recurring basis only (no installation fees are associated therewith).

Lastly, the number a subscriber dials to access the VMP to retrieve messages or perform other functions thereat will be based upon the EO to which the subscriber is homed. In other words, although all subscribers homed to the same EO can access the VMP to retrieve messages by dialing the same number, the number dialed by these subscribers will be different than the number dialed by subscribers homed to a different EO. Geographically-based access numbers derive from the FX lines themselves since all switching associated therewith is performed by the subscriber's EO. As one can imagine, geographically-based access numbers create problems in terms of the VMP service provider's ability to effectively administer and advertise its voice messaging services.

SUMMARY OF INVENTION

The above-identified problems are solved and a technical advance is achieved in the art by providing a hybrid method and system for accessing a voice messaging platform. An exemplary method for accessing a voice messaging platform includes: (1) forwarding a telephone call to the platform over a foreign exchange line when the telephone call involves a calling party who, upon call initiation to a called party, encountered a busy or ring-no-answer condition, so that the calling party is provided with an opportunity to leave a message for the called party in the called party's mailbox; and (2) routing a telephone call to the platform over a telephone trunk group local to the platform when the telephone call involves a caller initiating a telephone call directly to the platform to access the caller's mailbox.

For a standard call answer service (i.e. message storage and retrieval only), direct traffic to the VMP typically exceeds traffic forwarded to the VMP. For an enhanced call answer service (e.g. message storage and retrieval, creating, deleting and modifying personal greetings, voice mail with broadcast list capabilities, etc.) the disparity between direct traffic and forwarded traffic is even greater. By employing the hybrid method and system of the instant invention wherein direct calls and forwarded calls are routed differently, the above-identified problems are solved. As discussed in greater detail infra, fewer total lines (FX lines+local lines) are required to handle the same amount of traffic to the VMP (several costs previously incurred by the VMP provider are thereby eliminated) and, all subscribers, regardless of the EO to which they are homed, can access the VMP by dialing a single universal access number.

Other and further aspects of the present invention will become apparent during the course of the following description and by reference to the attached drawings.

DETAILED DESCRIPTION

Figure 1:
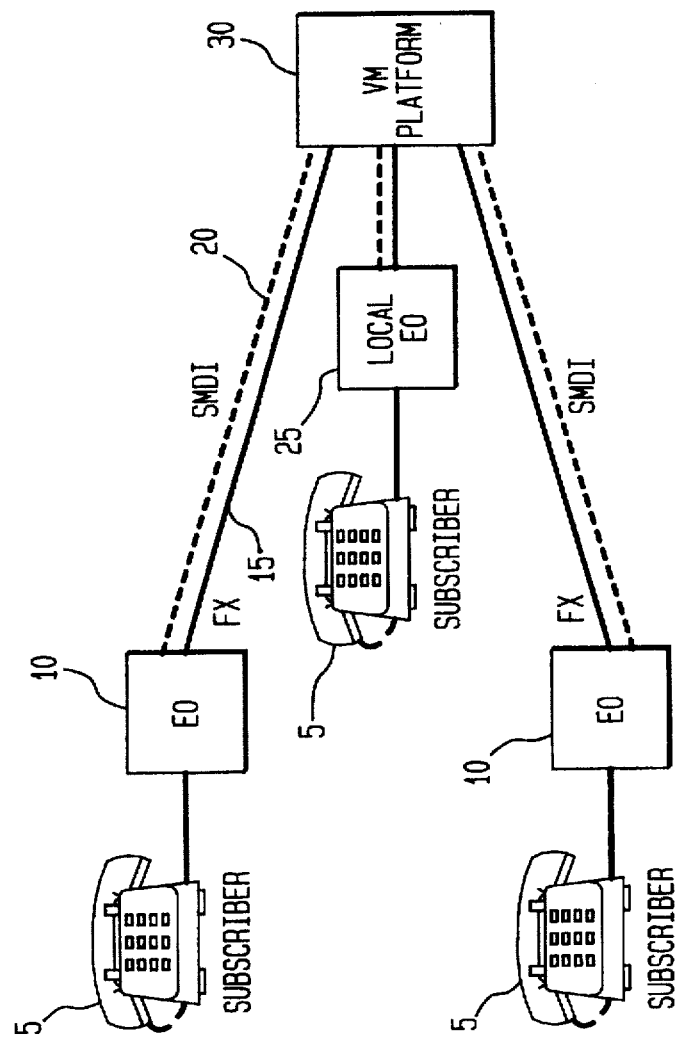
FIG. 1 is a block diagram illustrating a prior art architecture for accessing a voice messaging system.

Referring now to the drawings wherein like reference numbers refer to like parts, FIG. 1 is a block diagram of a prior an architecture for accessing a voice messaging system. FIG. 1 shows a Voice Messaging Platform (VMP) 30 serving a plurality of subscribers 5 homed to their respective EOs 10. The VMP 30 is connected to each of the EOs 10 via a group of FX lines 15. Each FX line 15 transmits both in-band supervisory signals and voice. Additional signaling required by the VMP 30 for each FX line 15 is provided out-of-band by a common Simplified Message Desk Interface (SMDI) link 20.

When a caller places a call to a subscriber 5 of the voice messaging service and the caller encounters a busy or ring-no-answer condition, the call is forwarded by the subscriber's EO 10, in a manner well known in the art, to the VMP 30 via an FX line 15 so that the caller may leave a message for the called party subscriber 5 in the subscriber's mailbox. Such calls to the VMP 30 are hereinafter referred to as "forwarded calls." The subscriber 5 can subsequently direct dial the VMP 30 via the FX lines 15 to access his/her mailbox to retrieve messages, administer greetings and/or send voice messages to other subscribers. Such calls are hereinafter referred to as "direct calls." Both forwarded and direct calls to the VMP 30 are treated as local calls for toll purposes.

On either call (forwarded or direct), call information is transmitted by the subscriber's EO 10 to the VMP 30 via an SMDI link 20. Call information typically includes the calling party number, the called party number (on forwarded calls, the VMP telephone number), the MLHG number, the MLHG member number, the forwarding party number (the original called party number), and the reason why the call is being forwarded from the subscriber's EO 10 to the VMP 30 (e.g. busy or ring-no-answer condition). The routing reason can be used by the VMP 30 for any number of reasons, including providing the caller with two different announcements, one for busy (e.g. "The party you are trying to reach is busy.") and one for ring-no-answer (e.g. "The party you are trying to reach is unavailable."). Upon ring-no-answer, the VMP 30 may then attempt to route the call to another telephone number at which the called party is available, before prompting the caller to leave a message.

Figure 2A:
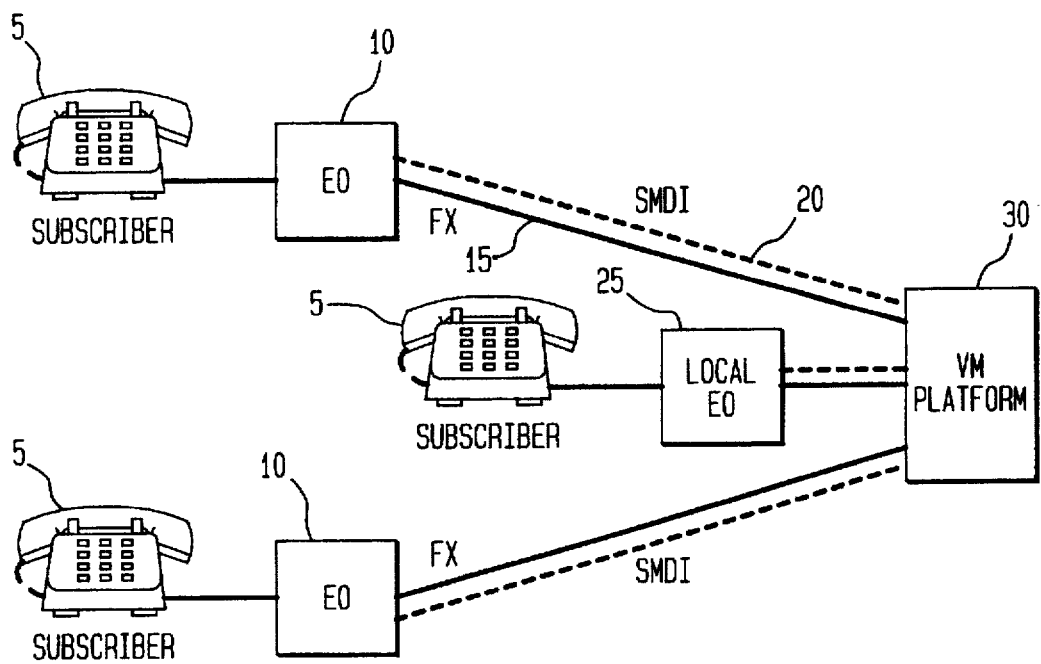
FIGS. 2a and 2b illustrate one embodiment of the present invention.
Figure 2B:
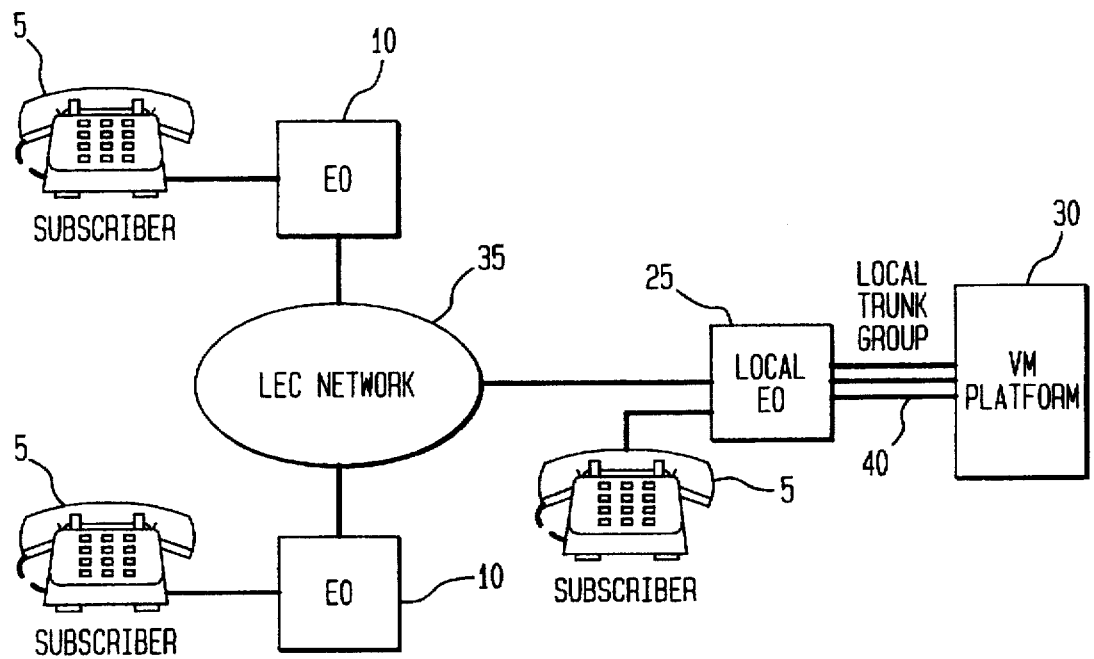

FIGS. 2a and 2b, taken together, illustrate one embodiment of the present invention. Although FIG. 2a is identical to FIG. 1, the architecture of FIG. 2a, in accordance with the present invention, is used only for forwarded calls.

In order to provide a full spectrum of voice messaging services, forwarded calls must pass all or most of the above-listed call information to the VMP 30. Because many local exchange carriers do not have the capability to, or simply refuse to, pass such a wide variety of information, via inter-office Common Channel Signaling (SS7), FX lines 15 and SMDI links 20 are used. However, direct calls to the VMP 30 need only pass the calling party number so that the VMP 30 can access the subscriber's 5 mailbox when the subscriber 5 is calling from his/her home telephone to retrieve a message, administer greetings, and/or send voice messages to other subscribers 5. Thus, for direct calls to the VMP 30, the architecture of FIG. 2b is used.

FIG. 2b depicts a Voice Messaging Platform (VMP) 30 serving a plurality of subscribers 5 homed to their respective EOs 10. The VMP 30 is connected to a Local Exchange Carrier (LEC) network 35 via a local trunk group 40 and a local EO 25. Direct calls originating in EOs 10 other than the local EO 25 are routed to the EO 25 by the LEC network 35 in a manner well known to those of ordinary skill in the art. The LEC network 35 is equipped with a Calling Line Identification ("Caller ID") service as is well known in the art and thus, the VMP 30 is provided with sufficient information (i.e. the calling party number) to process direct calls. Accordingly, FX lines and SMDI links are not employed for direct calls to the VMP 30.

In cases where the direct traffic to the VMP 30 exceeds the forwarded traffic, the hybrid access architecture of FIGS. 2a and 2b requires fewer total lines (FX lines+local lines) to handle the same mount of total traffic (direct traffic+ forwarded traffic). Moreover, this is indeed the most common case because the direct traffic consists, at the very least, of calls to retrieve messages that were deposited as a result of forwarded traffic. The sum total of the duration of all direct calls is then, at the very least, equal to the sum total of the duration of all forwarded calls.

However, there are a number of reasons why the sum total of the duration of all direct calls will far exceed the sum total of the duration of all forwarded calls. For example, a subscriber 5 calling to retrieve a message may want to hear the message, or portions thereof, more than once. Furthermore, a direct call may not necessarily be associated exclusively with message retrieval. For example, a subscriber 5 may respond to a message using Voice Mail (a common VMP feature) or, may simply call the VMP 30 to compose a message for distribution via voice mail to a list of other subscribers 5. Moreover, all administrative tasks a subscriber 5 performs in his/her mailbox are performed via direct calls to the VMP 30 and thus, serve to further increase the ratio of direct calls to forwarded calls. Such administrative tasks include creating, deleting, or modifying personal greetings and broadcast lists, navigating through menus, etc. Finally, outcalls from the VMP to a subscriber for purposes of message delivery increases the ratio of direct calls to forwarded calls even further.

As an example of the "line savings" associated with the present invention, consider the architecture of FIG. 1 and the case of 10 EOs, each of which requires 10 FX lines to handle all traffic to the VMP 30 with a probability of calls being blocked of less than one percent. We will assume, for the reasons discussed above, that 70 % of all traffic to/from the VMP is direct traffic and 30 % is forwarded traffic. In the hybrid access architecture of FIGS. 2a and 2b, all direct calls from subscribers 5 homed to the local EO 25, as well as those homed to remote EOs 10, are routed to the VMP 30 via the local trunk group 40. In other words, direct calls to the VMP 30 are switched at the EO 25 local to the VMP 30. As a result of this aggregation and, in accordance with a well known formula from traffic theory—namely, Erlang's B formula, one would now only need 5 FX lines from each end office for forwarded calls and, a local trunk group of 43 lines for direct calls, in order to maintain the same probability of blocking. In other words, one would only need a total of 93 lines in the hybrid access architecture of FIGS. 2a and 2b, versus 100 lines in the architecture of FIG. 1.

Accordingly, several costs previously incurred by the VMP 30 provider are eliminated. Returning to the foregoing example, for direct calls to the VMP 30, 7 FX lines were eliminated without having to replace them with local lines. Moreover, the 43 local lines are less expensive than the 50 FX lines that they replaced. As shown in FIG. 2b, rather than having to run an inter-office channel (i.e. an FX line) between a subscriber's EO 10 and the EO 25 local to the VMP 30 for direct calls, the pre-existing LEC Network 35 (which may comprise multiple inter-switches) is used to connect a subscriber's EO 10 and the EO 25 local to the VMP 30. As such, for direct calls the architecture of the present invention eliminates installation and recurring inter-office channel charges and recurring mileage charges.

Moreover, the architecture of FIG. 2b does not require geographically-based access numbers. All subscribers 5 access the VMP 30 to retrieve messages and perform other functions by dialing the same access number—namely, the telephone number of the VMP 30 present in the EO 25 local to the VMP 30. These calls would remain "local" for toll purposes for those subscribers 5 in the same Local Calling Area as the VMP 30.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. A method for accessing a voice messaging platform, comprising:
    forwarding a telephone call to said platform over a foreign exchange line when said telephone call involves a calling party who, upon initiation of said call to a called party, encountered a busy or ring-no-answer condition, so that said calling party may leave a message for said called party in said called party's mailbox; and
    routing a telephone call to said platform over a trunk group of a telephone switching office local to said platform when said telephone call involves a caller who initiates said telephone call to said platform to access said voice messaging platform.

2. The method of claim 1 wherein said forwarding step includes the step of said platform recording a message.

3. The method of claim 1 wherein said caller accesses said voice messaging platform to retrieve a message.

4. The method of claim 1 wherein said routing step includes the step of said platform playing a message.

5. The method of claim 1 wherein said forwarding step includes the step of transmitting a calling party number, a called party number, and a forwarding number to said platform via a signaling link.

6. The method of claim 5 wherein said forwarding step further includes the step of transmitting a reason for forwarding said call to said platform via a signaling link.

7. The method of claim 5 wherein said signaling link is an SMDI link.

8. The method of claim 1 wherein said routing step further includes the step of routing said telephone call to said trunk group over a local exchange carrier network capable of transmitting a caller's number associated with said telephone call.

9. The method of claim 8 wherein said routing step further includes the step of transmitting said caller's number from said trunk group to said platform so that said platform can use said caller's number to permit said caller to access said caller's mailbox without having to enter a mailbox ID.

10. A system for accessing a voice messaging platform, comprising:
    a local end office coupled to said platform via a local trunk group; and
    a remote end office coupled to said local end office via a local exchange carrier network and to said platform via foreign exchange lines;
    wherein a telephone call from a calling party to a called party number homed to said remote end office, that encounters a busy or ring-no-answer signal, is forwarded via said foreign exchange lines to said platform, so that said calling party may leave a message for said called party number in a mailbox of said called party number; and
    wherein a telephone call from a caller to said platform is routed via said local exchange carrier network and said local trunk group to said platform, so that said caller may access said voice messaging platform.

11. The system of claim 10 wherein said platform records a message.

12. The system of claim 10 wherein said telephone call from said caller to said platform is initiated by said caller to access said voice messaging platform to retrieve a message.

13. The system of claim 10 wherein said platform plays a message.

14. The system of claim 10 further comprising a signaling link coupling said remote end office to said platform for transmitting a calling party number, a called party number, and a forwarded number from said remote end office to said platform.

15. The system of claim 14 wherein said signaling link transmits, from said remote end office to said platform, a reason for forwarding said call to said platform.

16. The system of claim 14 wherein said signaling link is an SMDI link.

17. The system of claim 10 wherein said local exchange carrier network transmits a caller's number from said trunk group to said platform so that said platform can use said caller's number to permit said caller to access said caller's mailbox without having to enter a mailbox ID.

18. A system for accessing a voice messaging platform, comprising:
    a local end office coupled to said platform via a local trunk group, wherein said local end office includes switching circuits and special service circuits; and
    a remote end office coupled to said switching circuits via a local exchange carrier network and to said special service circuits via foreign exchange lines;

wherein a telephone call from a calling party to a called party number homed to said remote end office, that encounters a busy or ring-no-answer signal, is forwarded via said foreign exchange lines to said special service circuits for relay to said platform, so that said calling party may leave a message for said called party number in a mailbox of said called party number; and wherein a telephone call from a caller to said platform is routed via said local exchange carrier network to said switching circuits for transmission via said local trunk group to said platform, so that said caller may access a mailbox of said caller.

19. The system of claim 18 wherein said telephone call from a caller to said platform is initiated by said caller so as to access said mailbox of said caller to send a voice message to another mailbox.

20. A method performed by a provider of a voice messaging service to establish an efficient telephone messaging architecture, the method comprising the steps of:

initiating an installation of at least one foreign exchange line to provide a voice messaging platform with a presence at a first telephone office, wherein said first telephone office is local to at least one subscriber of the voice messaging service, said foreign exchange line for use in forwarding to a said platform telephone calls to said subscriber in which a calling party encounters a busy or ring-no-answer condition; and ordering a trunk group connection between a second telephone office and said messaging platform, said trunk group for use in carrying telephone calls by said subscriber to said platform.

* * * * *